United States Patent
McCutchan

(10) Patent No.: US 6,860,483 B2
(45) Date of Patent: Mar. 1, 2005

(54) GAS FILM HYDRAULIC SHAFT SEAL

(75) Inventor: Sean McCutchan, Hamden, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/241,257

(22) Filed: Sep. 10, 2002

(65) Prior Publication Data

US 2004/0046323 A1 Mar. 11, 2004

(51) Int. Cl.[7] ............ F16J 15/44; F16J 15/447; F01D 11/00
(52) U.S. Cl. .............. 277/411; 277/418; 415/171.1
(58) Field of Search ................. 277/346, 347, 277/411, 427, 428, 431–433; 415/109–110, 171.1, 175

(56) References Cited

U.S. PATENT DOCUMENTS

| | | | | |
|---|---|---|---|---|
| 913,407 A | * | 2/1909 | Ljungstrom | 277/347 |
| 1,394,959 A | * | 10/1921 | Wilkinson | 277/347 |
| 1,463,018 A | * | 7/1923 | Junggren | 384/134 |
| 1,843,122 A | * | 2/1932 | Carrier | 384/132 |
| 1,932,214 A | * | 10/1933 | Hornschuch | 277/425 |
| 2,873,986 A | * | 2/1959 | Murray | 277/425 |
| 3,694,042 A | * | 9/1972 | Rabenhorst | 384/132 |
| 4,335,885 A | * | 6/1982 | Heshmat | 277/347 |
| 4,426,088 A | * | 1/1984 | Ernst | 277/427 |
| 4,455,026 A | * | 6/1984 | Pinkus et al. | 277/301 |
| 4,570,947 A | | 2/1986 | Smith | |
| 5,655,852 A | * | 8/1997 | Duffney et al. | 405/128.2 |
| 6,020,664 A | * | 2/2000 | Liu et al. | 310/90 |
| 6,679,501 B1 | * | 1/2004 | Pelstring et al. | 277/409 |

FOREIGN PATENT DOCUMENTS

GB     2 125 118 A     2/1984

* cited by examiner

Primary Examiner—Alison Pickard
Assistant Examiner—Vishal Patel
(74) Attorney, Agent, or Firm—Bachman & LaPointe, P.C.

(57) ABSTRACT

The present invention relates to a seal system for use in rotary machines. The seal system includes a first member and a second member forming an annulus, a high pressure region and a low pressure region in the annulus, and a liquid seal intermediate the first and second members and intermediate the high pressure region and the low pressure region for reducing gas leakage from the high pressure region to the low pressure region.

13 Claims, 3 Drawing Sheets

GAS FILM HYDRAULIC SHAFT SEAL

BACKGROUND OF THE INVENTION

The present invention relates to a seal system for use in a rotary machine such as a gas turbine engine.

The present invention address a fundamental issue plaguing current designs considered for the sealing of an annulus between two concentric shafts where rotation of the sealing members is required due to a lack of stationary mounting points. Prior art sealing methods incorporate a solid secondary seal such as a piston ring. For any inter-shaft applications lacking stationary sealing members, inertia forces experienced by a solid secondary seal create high friction forces between the secondary seal and its supporting members, thereby preventing axial travel or at least resulting in undesirable wear.

SUMMARY OF THE INVENTION

Accordingly, it is an object of the present invention to provide a seal system for use in a rotary machine.

It is a further object of the present invention to provide a seal system which is capable of sealing the annulus formed between two concentric shafts with co-rotating or counter-rotating behavior.

It is yet another object of the present invention to provide a seal system which is capable of sealing the annulus formed between a shaft and a stationary member.

It is still another object of the present invention to provide a seal system which reduces gas leakage from a high pressure region to a lower pressure region.

The foregoing objects are attained by the seal assembly of the present invention.

In accordance with the present invention, a seal system for use in a rotary machine broadly comprises a first member and a second member forming an annulus, a high pressure region and a lower pressure region in the annulus, and a liquid seal intermediate the first and second members and intermediate the high pressure region and the low pressure region for reducing gas leakage from the high pressure region to the low pressure region.

Other details of the gas film hydraulic shaft seal of the present invention, as well as other objects and advantages attendant thereto, are set forth in the following detailed description and the accompanying drawing wherein like reference numerals depict like elements.

DETAILED DESCRIPTION OF THE PREFERRED EMBODIMENT(S)

Figure 1:
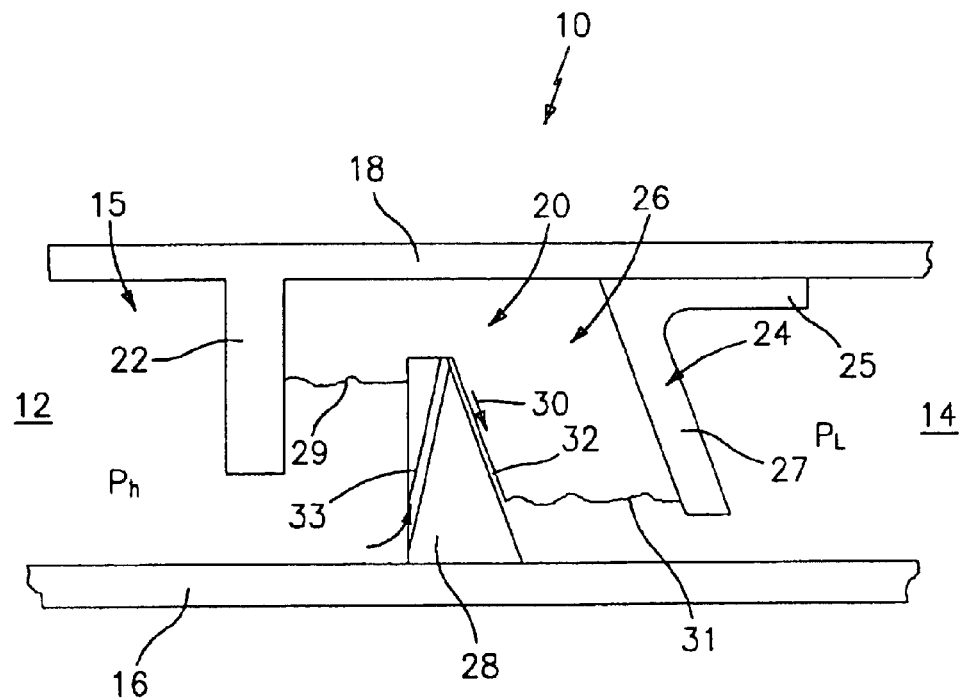
FIG. 1 illustrates a shaft seal system in accordance with the present invention.
Figure 2:
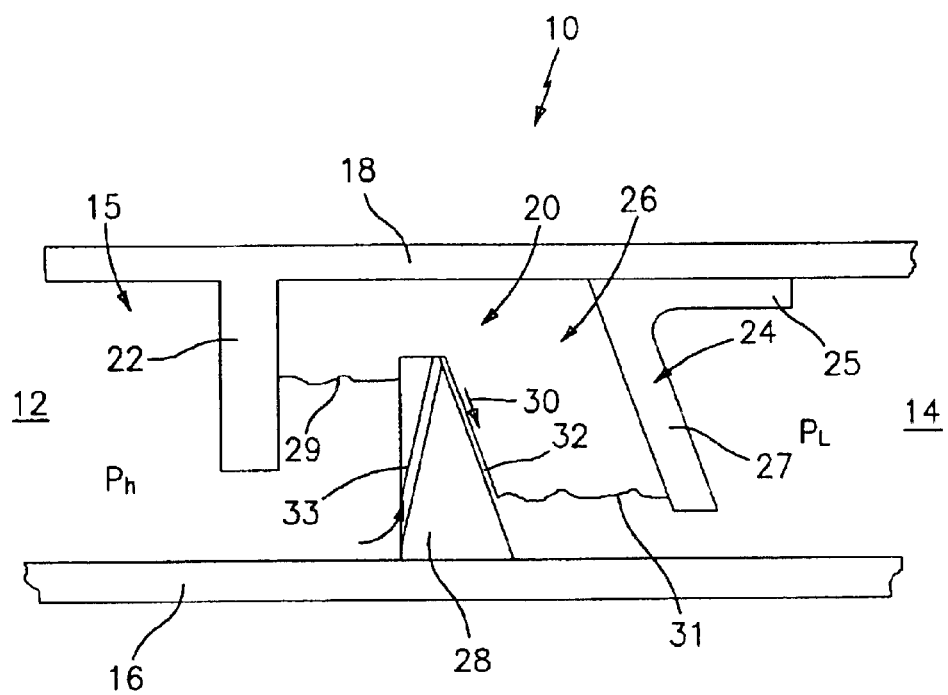
FIG. 2 illustrates the shaft seal system of FIG. 1 with co-rotating shafts.
Figure 3:
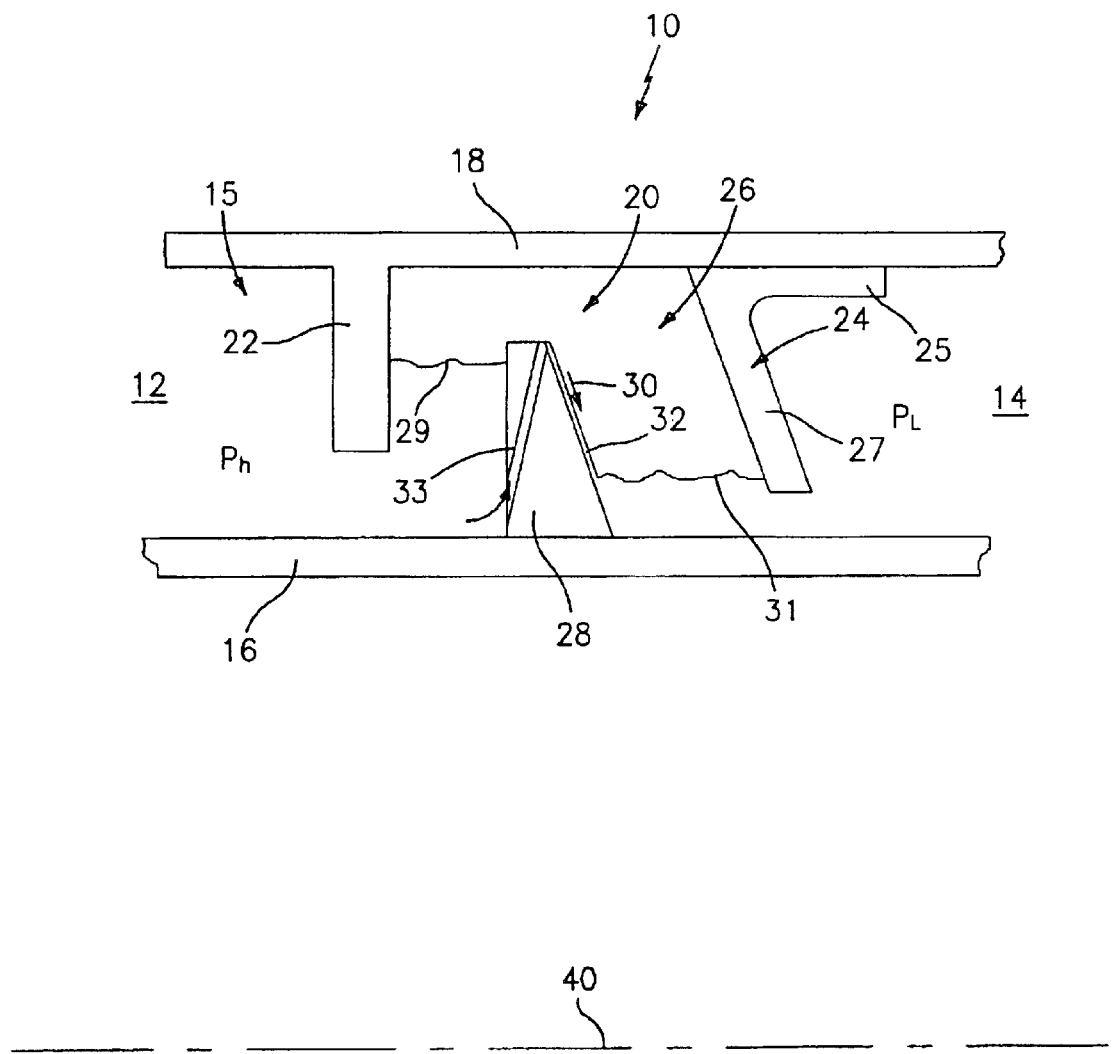
FIG. 3 illustrates the shaft seal system of FIG. 1 with counter-rotating shafts.

FIG. 1 illustrates a shaft seal system 10 in accordance with the present invention. In this assembly, a liquid is used in combination with a gas film to reduce gas flow from a high pressure $P_h$ region 12 to a lower pressure $P_L$ region 14 in an annulus 15 located between first and second members 16 and 18, respectively. The first and second members 16 and 18 may be two shafts with co-rotating (see FIG. 2) and counter-rotating (see FIG. 3) behavior having a centerline 40. Alternatively, one of the members 16 and 18 may be a shaft and the other of the members 16 and 18 may be a stationary member.

As can be seen from FIG. 1, a trough 20 is formed in the annulus 15 by the second member 18 and by parts 22 and 24. The part 22 comprises a radially extending member which protrudes from and is preferably integrally formed with the second member 18. The part 24 comprises a ring member of V-shaped cross-section having a first leg 25 attached to the second member 18 and a second leg 27 at an angle to the first leg 25. The part 24 may be attached to the second member 18 using any suitable means known in the art.

The trough 20 is filled with a liquid 26, such as oil. The levels 29 and 31 of the liquid are maintained by the pressures $P_h$ and $P_L$ respectively. A fin 28 is provided in the trough 20. As can be seen from FIG. 1, the fin 28 protrudes into the liquid 26. The fin 28 is mounted on the first or inner member 16 and has a passageway 33 extending therethrough. The fin 28 may be mounted on the first member 16 using any suitable means known in the art.

In use, some gas from the high pressure region 12 is allowed to pass through the passageway 33 in the fin 28 to form a gas film or gas-liquid mixture 30 that separates the liquid 26 from an inclined surface 32 of the fin 28. The gas film or mixture 30 offers less friction than the parts 18, 22 and 24, thus enabling the liquid 26 to rotate at a velocity approaching that of the second member 18. The surface 32 is angled for the purpose of retaining the gas film or mixture 30 along the surface 32. The resulting fluid inertia prevents nearly all gas leakage from the high pressure region 12 to the low pressure region 14. Thus, a liquid seal is created which prevents gas leakage between the two members 16 and 18. As mentioned before, the members 16 and 18 may be shafts that rotate in opposite directions or the same direction.

The liquid 26 in the seal system is preferably oil which is replenished when the rotary machine is operating.

It is apparent that there has been provided in accordance with the present invention a gas film hydraulic shaft seal which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations which fall within the broad scope of the appended claims.

What is claimed is:

1. A seal system rotary machine comprising:
    a first member and a second member forming an annulus;
    a high pressure region and a low pressure region in the annulus;
    a liquid seal intermediate said first and second members and intermediate said high pressure region and low pressure region for reducing gas leakage from said high pressure region to said low pressure region;
    said liquid seal comprising a trough containing a liquid and a triangular fin which protrudes into said liquid in said trough; and
    said fin has a gas passageway extending therethrough to separate said liquid from a surface of said fin.

2. A seal system according to claim 1, wherein said first member comprises a stationary member and said second member comprises a shaft.

3. A seal system according to claim 1, wherein said first member comprises a first shaft and said second member comprises a second rotating shaft.

4. A seal system according to claim 3, wherein said first shaft and said second shaft are co-rotating.

5. A seal system according to claim 3, wherein said first shaft and said second shaft are counter-rotating.

6. A seal system according to claim 1, wherein said trough is formed by said second member, a first part attached to said second member, and a second part attached to said second member.

7. A seal system according to claim 6, wherein said first part comprises a radially extending member protruding from said second member.

8. A seal system according to claim 7, wherein said first part is integrally formed with said second member.

9. A seal system according to claim 1, said fin has an inclined surface wherein a gas film is formed on said inclined surface to separate said liquid from said inclined surface.

10. A seal system according to claim 1, wherein said fin is mounted on said first member.

11. A seal system according to claim 1, wherein said first member is an inner member and said second member is an outer member.

12. A seal system according to claim 1, wherein said liquid is oil.

13. A seal system for a rotary machine comprising:

a first member and a second member forming an annulus;

a high pressure region and a low pressure region in the annulus;

a liquid seal intermediate said first and second members and intermediate said high pressure region and low pressure region for reducing gas leakage from said high pressure region to said low pressure region;

said liquid seal comprising a trough containing a liquid and a fin having a inclined surface which protrudes into said liquid in said trough;

said trough being formed by said second member, a first part attached to said second member, and a second part attached to said second member; and said second part having a first leg attached to said second member and a second leg at an angle to said first leg.

* * * * *

UNITED STATES PATENT AND TRADEMARK OFFICE
CERTIFICATE OF CORRECTION

PATENT NO. : 6,860,483 B2 Page 1 of 1
APPLICATION NO. : 10/241257
DATED : March 1, 2005
INVENTOR(S) : Sean McCutchan It is certified that error appears in the above-identified patent and that said Letters Patent is hereby corrected as shown below:

Column 2,
Line 49, after "system", insert -- for a --.

Signed and Sealed this

Twentieth Day of June, 2006

JON W. DUDAS
*Director of the United States Patent and Trademark Office*